Figure 1:
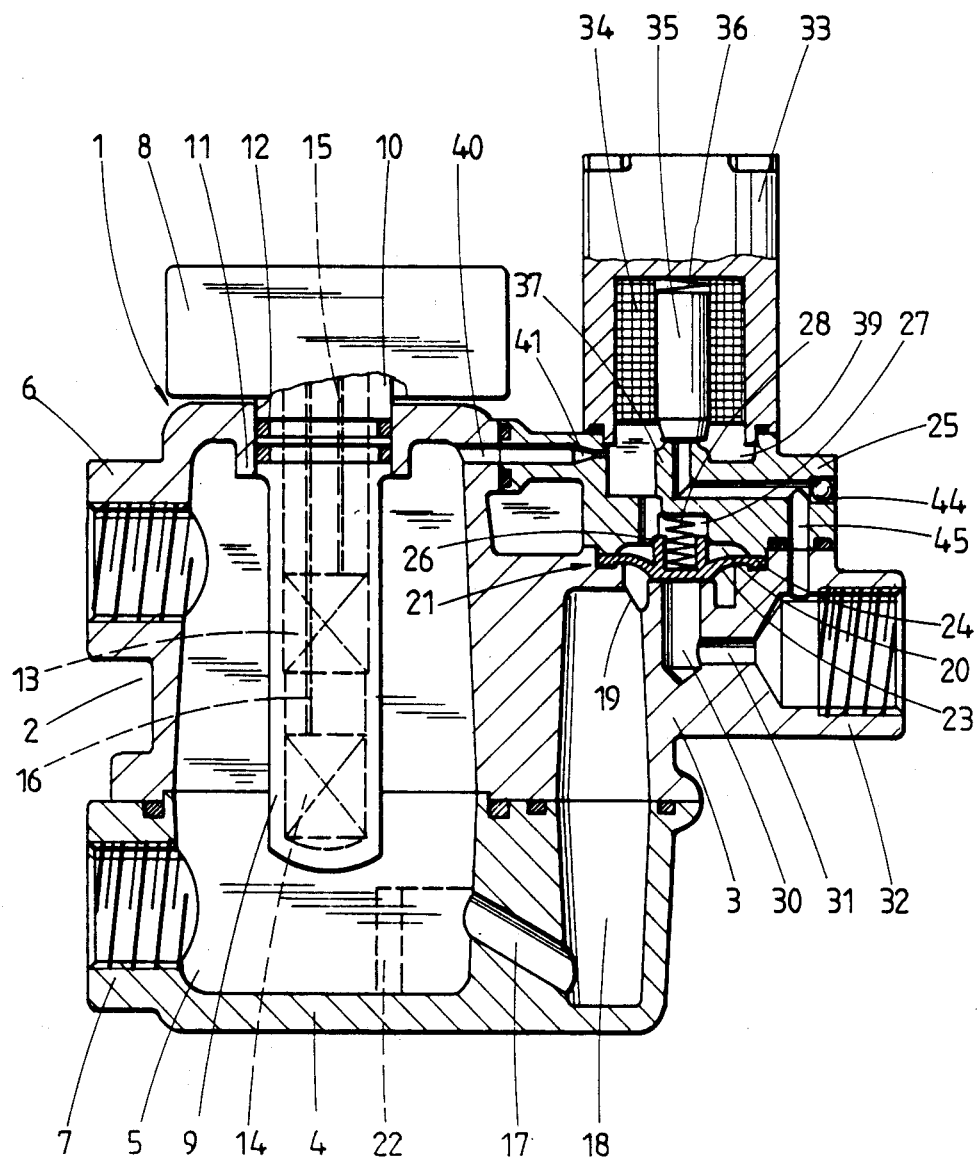

United States Patent [19]
Koch

[11] Patent Number: 4,974,626
[45] Date of Patent: Dec. 4, 1990

[54] CONDENSATE TRAP FOR SYSTEMS UNDER PRESSURE

[76] Inventor: Berthold Koch, Jasminweg 26, D-4040 Neuss, Fed. Rep. of Germany

[21] Appl. No.: 503,795

[22] Filed: Apr. 2, 1990

[30] Foreign Application Priority Data

Apr. 5, 1989 [DE] Fed. Rep. of Germany ....... 3910919

[51] Int. Cl.⁵ ............................................. G05D 9/12
[52] U.S. Cl. ..................................... 137/187; 137/392
[58] Field of Search .......................... 137/187, 392, 195

[56] References Cited

U.S. PATENT DOCUMENTS

| | | | |
|---|---|---|---|
| 2,295,097 | 9/1942 | Waugh | 137/392 X |
| 2,529,796 | 11/1950 | Cade | |
| 3,292,650 | 12/1966 | Bird et al. | 137/392 X |
| 3,905,385 | 9/1975 | Green | 137/187 |

FOREIGN PATENT DOCUMENTS

3149830 10/1985 Fed. Rep. of Germany .

*Primary Examiner*—Alan Cohan
*Attorney, Agent, or Firm*—Pearne Gordon, McCoy & Granger

[57] ABSTRACT

In a so-called condensate trap for discharging condensate, e.g. oil or water from a fluid system which contains air or a gas or vapor under pressure, a single tube which projects into a housing in which the condensate collects contains spaced sensors of an electric capacitive type sensing the maximum level which the condensate is to be allowed to reach within the chamber and a predetermined lower level. A signal from the upper sensor triggers a pilot valve which opens a diaphragm-type discharge valve and a signal from the lower sensor initiates closing of the valve, but only after a time delay, allowing the condensate to fall first to a level below that of the lower sensor. This time delay is related to the time taken for the condensate to fall from the maximum level to that of the lower sensor. The control unit and sensor tube form a self-contained structural assembly for easy installation and replacement. In the floor of the housing forming the condensate collecting chamber there is a weir or well to prevent sediment reaching the diaphragm valve.

12 Claims, 2 Drawing Sheets

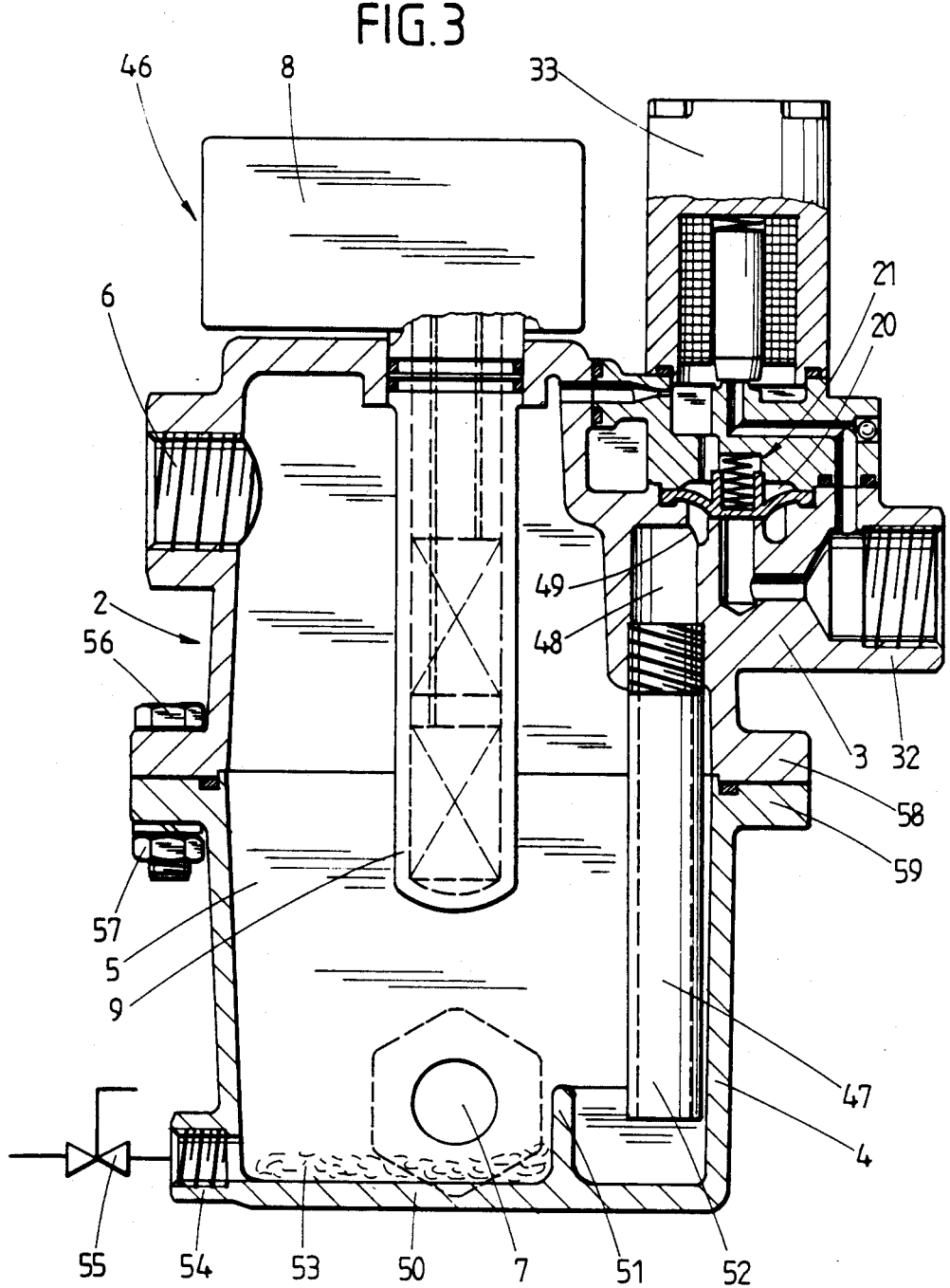

CONDENSATE TRAP FOR SYSTEMS UNDER PRESSURE

This invention relates to a so-called condensate trap, that is to say, means for discharging condensate from fluid systems under pressure.

In pressurised gas, vapour or air systems there is a tendency for water or oil condensate to separate out, for example vapour from atmospheric air or oil from compressors in the system. As a rule this condensate is very aggressive and accordingly it has to be collected within the closed system and discharged from time to time, but without losing any significant quantity of the gas or air in the system and without any significant drop in pressure.

For this purpose it is known to use float-controlled condensate traps but in these there is the danger of sticking, which can lead to the condensate not being discharged or alternatively to the escape of the compressed air or gas and complete loss of pressure.

In one known form of trap (DE-P 31 49 830), these drawbacks have been overcome and this device has generally speaking proved satisfactory. However, where this device is used with only one sensor it is necessary for the solenoid-operated valve, triggered by a signal from this sensor, to be time-controlled and here again there is the danger of possible loss of pressure and high energy costs. On the other hand, when it is used with at least two separate sensors there is the problem that they take up a significant amount of space and so the equipment is bulky and difficulties arise in installation and in layout.

To this must be added that the stress on the outlet valve is relatively severe during operation, and the construction is, as a whole, expensive.

The principal object of the present invention is to provide an improved form of condensate trap in which the loading or stress on the discharge valve is less severe in use and of which furthermore the overall construction is simpler and more compact and consequently more economical.

This object is achieved according to the invention by a condensate trap for a system under pressure comprising a condensate collecting chamber, said chamber having means for permanently connecting it into said system and having an outlet, a diaphragm valve normally closing said outlet, sensing means within said chamber, said sensing means comprising a tube projecting into said chamber and at least two separate sensors within said tube, said sensors being of an electric capacitive type and being responsive to different levels of liquid condensate within said chamber, a pilot valve in a chamber, a connection between said sensors and said pilot valve whereby to open and close said pilot valve in response to said different levels of condensate, said pilot valve controlling operation of said diaphragm valve.

Thus although there are at least two sensors sensing different condensate levels there is only a single body, the tube, projecting into the collecting chamber. The tube is preferably made of electrically non-conducting material, e.g. ceramic or plastics. There are preferably just two sensors.

When the condensate reaches a predetermined higher level the pilot valve is actuated and this in turn opens the diaphragm valve, allowing the condensate to be discharged. When the level falls to a predetermined lower value, closing of the diaphragm valve is initiated. Preferably the signal for closing the diaphragm valve is only produced after a predetermined time delay following sensing of the condensate level having reached the said predetermined lower value. This means that the actual minimum level reached before the valve is closed can be lower than the position of the lower sensor, and so the tube containing the sensor does not have to extend down, within the chamber, as far as that minimum level.

In the trap according to the invention the level of the condensate is determined in a manner completely free from wear, as the capacitive method involves no moving parts and therefore no danger of sticking; moreover the system will respond equally well to oil or water or other condensates without any adjustment.

When the sensing means detect that the condensate has reached the upper level a signal is sent to cause opening of the diaphragm valve. The time taken for the condensate level to reach the predetermined value can be measured and at that moment a signal is still not sent to cause closing of the valve but the period observed is used to select the appropriate time delay before that closing signal is sent. Thus preferably the detected time period is multiplied by an appropriate factor greater than one, related to the inverse ratio between, on the one hand, the difference between the upper level and sensed lower value, and on the other hand between the upper level and lowest permissible actual level in the chamber. On expiry of this extended time period the diaphragm valve is closed.

In this way it is furthermore possible to choose the multiplying factor so that the valve actually remains open longer than is necessary for complete discharge of the condensate which has collected. As a result, in the final part of the open period of the valve, pure air or gas can pass out through the diaphragm valve, with the object of flushing out the region of the outlet, in particular of the diaphragm valve itself. The control is so accurate and sensitive that it is easy to ensure that only a negligible quantity of the gas or air in the system is bled out for this purpose, as the rate of fall of condensate is measured electronically and the overall duration of the opening period can be closely controlled.

Using two capacitive sensors, one sensing the maximum level, the other sensing the lower level and both mounted in the same tube, not only does this save space, but also only a single aperture has to be provided in the wall of the chamber to receive the sensing means.

Preferably the tube is arranged vertically, to provide optimum sensitivity, with the two sensors spaced vertically apart. It is then possible to cover a predetermined maximum or minimum of the condensate level without the necessity for arranging the sensors next to one another, i.e. apart from a co-axial disposition, so that a layout is achieved which is very economical in space.

Preferably a housing containing the necessary electronic control equipment is mounted on that end of the tube furthest from its free end and together they form an easily manufactured and handled self-contained unit which is easy to mount and to service or maintain, or if necessary to replace.

Only that part of the unit which contains the sensors needs to project into the chamber and this part can be relatively small, and so can the housing of the chamber.

The inlet from the condensate chamber into a chamber containing the pilot valve preferably has a smaller cross-section than an outlet from that pilot valve chamber, and the pressure in the pilot valve chamber is communicated to the back face of the diaphragm valve, and thereby operation of the pilot valve allows movement of the diaphragm valve to be smooth and shock-free, with no sudden changes in pressure, so that premature wear of the diaphragm is avoided. Moreover, with this manner of operation, the connection between the condensate chamber and the pilot valve chamber remains open and fixed, i.e. does not have to be interrupted in order to operate the diaphragm valve.

Preferably a weir or baffle plate is arranged ahead of a pipe connecting the condensate collecting chamber with an outlet chamber leading to the diaphragm valve, to prevent any impurities or sediment which have been deposited on the floor of the collecting chamber from being stirred up on discharge of the condensate and being carried out together with the condensate. Otherwise, in some situations such impurities could block up and jam the diaphragm valve and the discharge pipe in such a manner that even with the above-mentioned provision for flushing through with gas or air after discharge of the condensate, no satisfactory cleaning is possible or is achieved.

Further features and advantages of the invention are revealed by the following description and the drawings.

Figure 2:
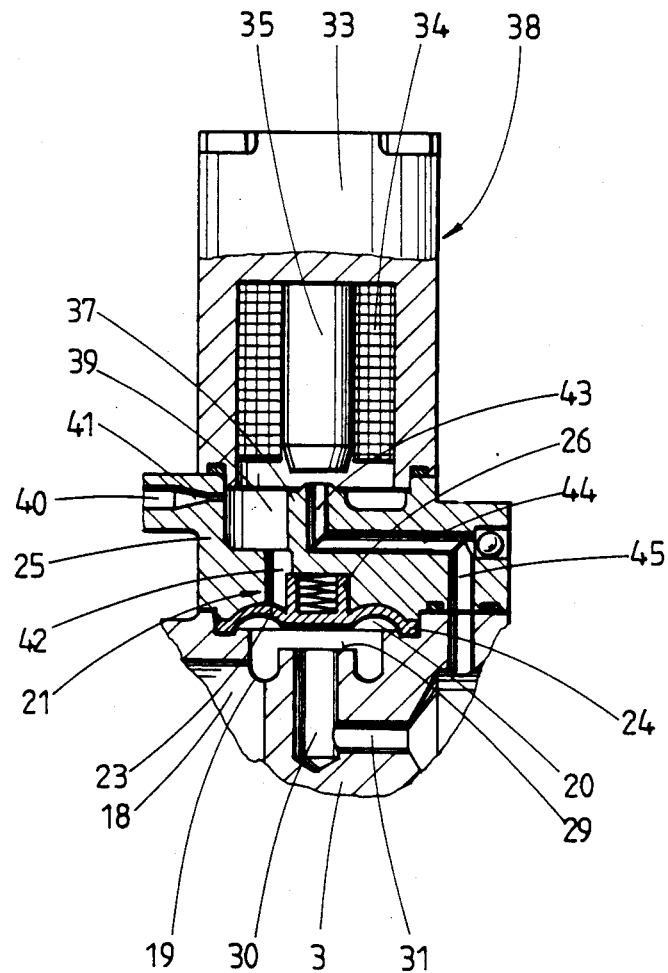

In the drawings are shown two embodiments by way of example of the means according to the invention for discharging condensate from pressurised systems, and in fact FIG. 1 is a vertical section through a first embodiment, the diaphragm valve being shown in its closed position which it normally occupies, FIG. 2 is a partial section of the device of FIG. 1, the diaphragm valve being shown open, and FIG. 3 is a vertical section through a second embodiment, the diaphragm valve being in its closed position.

The device 1 illustrated in FIG. 1 for discharging condensate from pressurised systems, such as compressed air or compressed gas systems, has a housing 2 with an upper part 3 and a lower part 4 and defining a collecting chamber 5 for condensate. The upper part 3 is provided with a connecting piece 6 and the lower part with a connecting piece 7, which both open into the collecting chamber 5 and serve for incorporating the device in a pressurised system, not shown. Normally the connecting piece 6 is used as an inlet so that the connecting piece 7 is closed off by means of a plug or cap, (not shown) but it is also possible to employ the connecting piece 7 for the inlet. In that case an air feeding and venting pipe is connected to the piece 6. This is led back to the same pressure potential from which the condensate is bled.

Mounted on the upper face of the upper part 3 is an electronic control unit 8 which has a measuring sensing tube projecting vertically downwards into the collecting chamber 5 from above and having its lower end closed, the tube having a cylindrical body of electrically non-conducting material (e.g. plastics or ceramic) which projects into the collecting chamber 5 through a mounting flange 11 in the upper part 3 of the housing 2 and is sealed with respect to the flange 11 by sealing rings 12.

Arranged spaced apart one above the other in the tube 9 are two capacitive sensors 13,14 which are each electrically connected through electric leads 15 and 16 to the electronic control unit 8; thus the condensate level in the chamber is determined electronically by capacitive means, entirely without wear. The upper sensor 13 serves to determine the highest permissible level of the condensate in the chamber 5, whilst the lower sensor 14 gives an indication of a lower level, related to the of the minimum permitted level, so that the electronic control unit 8 can produce the required control signals for opening and closing the outlet valve.

The collecting chamber 5 is connected through a downwardly inclined passage 17 to an outlet chamber 18 which has at its upper end an opening 19 leading into the chamber 20 of a diaphragm valve 21.

No particles of dirt or debris can be sucked up from the floor of the collecting chamber 5 as the entry point of the outlet passage 17 lies at a higher level. If the opening of the passage 17 lies at a lower level and the outlet takes place not through an outlet chamber 18 but through a riser pipe 47 (as illustrated in FIG. 3), a weir 22, baffle plate or wall can be arranged ahead of the of the inlet end of the passage or the riser pipe in order to prevent impurities deposited on the floor of the collecting chamber being stirred up on discharge of the condensate from the chamber and being carried out with the condensate or with following compressed gas or air, which could block up the outlet passage and/or the diaphragm valve 21 or otherwise adversely affect its functioning.

The diaphragm valve 21 has a flexible diaphragm 23 of which the outer periphery 24 is clamped between the upper part 3 of the housing 2 and an extension piece 25 secured on the upper part 3. The diaphragm is located by a centrally arranged sleeve 26 guided to slide in a blind hole 27 in the extension piece 25. A coil spring 28 in the sleeve 26 and abutting against the end of the blind hole 27 urges the diaphragm 23 downwards.

To lift the diaphragm 23 from the valve seating 29 in the position shown in FIG. 2 the force of the spring 28 must be overcome.

A blind bore 30 in the upper part 3 extends downwards from the valve seating 29 and leads via a transverse bore 31 into an outlet connection 32. A discharge pipe, not shown, can be connected to the outlet connection 32. Atmospheric pressure prevails in the outlet connection 32 whereas in the collecting chamber 5 the above-atmospheric pressure of the pressurised system is maintained during operation.

A solenoid 33 having a winding 34 and an armature 35 is mounted on the extension piece 25. A compression spring 36 engages the upper end of the armature 35 and urges it downwards against the extension piece 25.

The solenoid 33 is actuated from the control unit 8. When an electric current passes through the winding 34 it pulls the armature 35 in so that the armature is raised to the position illustrated in FIG. 2. With the winding 34 de-energised the armature 35 lies in the position illustrated in FIG. 1 in which it engages a seating 37 on the extension piece 25, being urged against it by the spring 36 and by the pressure prevailing in a control chamber 39.

The solenoid 33 forms together with the armature 35 and seating 37 a pilot valve 38 by means of which the diaphragm valve 21 is actuated.

Between the solenoid 33 and the extension piece 25 is the chamber 39 into which a passage 40 leads from the upper end of the collecting chamber 5. This passage is straight and smooth, i.e. the internal surface which defines the passage has neither corners nor ledges on which, for example contamination could lodge. That end 41 of the passage 40 which opens into the chamber 39 is narrowed or tapered in the manner of a venturi nozzle. The transition between that end 41 which is formed like a venturi nozzle and the remainder of the passage 40 likewise has no projections, corners or ledges.

The chamber 39 is in communication through a vertical passage 42 with the chamber 20 at the upper side of the diaphragm valve 21 so that the pressure which prevails in the chamber 39 also acts on the upper face of the diaphragm 23. In the seating 37 of the extension piece 25 there is a central bore 43 which communicates with the outlet connection 32 through two mutually connecting passages 44, 45.

The device illustrated in FIG. 1 and 2 operates in the following manner:

Under normal conditions the individual components of the device 1 are in the positions illustrated in FIG. 1. The above-atmospheric pressure in the pressurised system to which the device is connected prevails in the collecting chamber 5. This pressure prevails also in the outlet chamber 18, this being because of the connection through the passage 17, and in the chamber 39, which communicates with the collecting chamber 5.through the permanently open control passage 40 Accordingly the pressure acts also on the upper face of the diaphragm 23 because the passage 42 forms a permanently open connection from the chamber 39 to the chamber 20 behind the diaphragm valve 21. The diaphragm 23 is therefore pressed firmly onto its seating 29, assisted by the coil spring 28. The solenoid 33 is de-energised so the armature 35 engages its seating 37 and it is pressed down onto it by the pressure, assisted by the spring 36. Both valves 21, 38 are closed and so any condensate reaching the chamber 5 from the pressurised system is collected there.

Condensate in the housing 2 collects in the collecting chamber 5 through the inlet connection piece 6 or 7.

When the liquid level of the condensate in the chamber 5 rises to the maximum height so that the capacitive sensor 13 in the tube 9 sends an electrical signal to the control unit 8, the latter delivers a control signal which energises the solenoid 33. This pulls in the armature 35, lifting it off its seating 37 and it is held in the position shown in FIG. 2. This uncovers the bore 43, resulting in communication between the chamber 39 and the outlet connection 32. As above-atmospheric pressure is present in the chamber 39, but atmospheric pressure in the outlet spigot 32, air or gas flows from the chamber 39 into the outlet connection 32, and so the pressure in the chamber 39 and thereby also the pressure acting on the upper face of the diaphragm 23, falls. It is true that some air or gas does flow from the chamber 5 through the passage 40, but this cannot balance the fall in pressure in the chamber 39 because the cross-section of the bore 43 is chosen to be substantially larger than the cross-section at the reduced end 41 of the passage 40. The above-atmospheric pressure in the collecting chamber 5 is still acting on the underside of the diaphragm 43, which now causes the diaphragm 23 to be lifted from its seating 29. Condensate flows through the opening 19 via the outlet chamber 18 into the chamber 20 and from this through the bore 30, 31, into the outlet connection 32.

The arrangement is chosen to be such that the pressure in the chamber 39 is lower than the pressure acting on the underside of the diaphragm 23 as long as the pilot valve 38 is open and the armature 35 is lifted clear of its seating 37; the diaphragm valve 21 remains open as long as the pilot valve 38 is open, and during this time the pilot valve has compressed air or gas flowing through it and thereby flushing it through.

On expiry of the predetermined opening time of the diaphragm valve 21 the control unit 8 delivers a signal causing the solenoid 33 to be de-energised. This causes the armature 35 to drop onto the seating 37 and it is also pressed down by the spring 36; the bore 43 is now closed. By virtue of the gas or air continuing to flow through the passage 40 from the chamber 5 pressure is built up again in the chamber 39 until it reaches the same pressure as that in the collecting chamber 5. This pressure acts through the connecting via the passage 42 again on the upper face of the diaphragm 23 so that, assisted by the spring 28, it urges the diaphragm 23 into the closed position shown in FIG. 1. Then no more gas or air or condensate can then flow out of the collecting chamber 5 until the pilot valve 38 is opened once again.

Preferably the time interval between production of the maximum level signal from the first sensor 13 and the lower level signal from the sensor 14 is determined in the electronic control unit 8. When the lower level is reached, no control signal is yet issued to close the outlet valve 21 again. On the contrary the measured time interval is multiplied in the unit 8 by a factor which is obtained from the relationship of the height between minimum and maximum and that between minimum and the lowest desired level in the collecting chamber 5. It is in this way that the overall duration of the opening time of the diaphragm valve 21 is determined. When this time runs out the electronic measuring unit 8 delivers the closing signal, and the condensate is then at a level significantly below that of the lower sensor 14. Alternatively, as explained earlier, the valve could be kept open long enough to discharge all the condensate and then follow this with a brief blast of gas or air.

The device 46 illustrated in FIG. 3 largely follows in its construction and manner of operation the device illustrated in FIG. 1 and FIG. 2. Accordingly the same parts have been given the same reference numerals and are not described further in the following so at to avoid repetition.

The most important difference lies in the fact that for conducting the condensate out of the collecting chamber 5 a riser pipe 47 is arranged on the upper part 3 of the housing 2 and is inserted in a blind hole 48. The hole 48 leads through an opening 49 into the chamber 20 of the diaphragm valve 21.

An upstanding weir 51 is formed on the floor 50 of the lower part 4, projecting into the interior of the collecting chamber 5 and defining a well into which the lower end 52 of the pipe 5 projects.

Dirt 53 can collect on the floor 50 of the lower part 4 outside the weir 51 which forms a kind of trough or well, and the dirt can be blown out from time to time through a connection 54 by means of a cock 55 actuated for example by hand, before it can rise to the level of the connecting piece 7.

FIG. 3 also shows how the upper part 3 and the lower part 4 of the housing 2 can be detachably secured together by threaded bolts 56 and nuts 57 inserted through mutually engaging flanges 58, 59.

If a predetermined time interval, e.g. sixty seconds, after the first (maximum) signal has been received the second (minimum) signal, triggered by the lower sensor, has still not been received, then a so-called alarm control is initiated by the electronic control unit 8 and the pilot valve 38 is closed anyway. As long as this alarm condition prevails, it is arranged that the valve 38 is opened for five seconds every four minutes.

What is claimed is:

1. A condensate trap for systems under pressure comprising a condensate collecting chamber, said chamber having means for permanently connecting it into said system and having an outlet, a diaphragm valve normally closing said outlet, sensing means within said chamber, said sensing means comprising a tube projecting into said chamber and at least two separate sensors within said tube, said sensors being of an electric capacitive type and being responsive to different levels of liquid condensate within said chamber, a pilot valve in a chamber, a connection between said sensors and said pilot valve whereby to open and close said pilot valve in response to said different levels of condensate, said pilot valve controlling operation of said diaphragm valve.

2. The means set for in claim 1 wherein said sensor means comprises two of said capacitive sensors.

3. The means set forth claim 2 wherein said tube is arranged projecting vertically into said collecting chamber.

4. The means set forth in claim 3 wherein said sensors are arranged vertically spaced apart.

5. The means set forth in claim 1 wherein said condensate chamber is formed in a housing and said tube and said electronic control unit form a self-contained structural assembly mounted on said housing and removable therefrom.

6. The means set forth in claims 5 wherein only that part of said structural assembly comprising said tube containing said sensors projects into the interior of said housing.

7. The means set forth in claim 1 wherein the inlet into the chamber of said pilot valve from said collecting chamber has a smaller cross-section than the outlet from said pilot valve chamber and said pilot valve chamber communicates permanently with the back face of the diaphragm of said diaphragm valve.

8. The means set forth in claim 1 wherein said diaphragm valve further includes a spring, said spring urging it to its closed position.

9. The means set forth in claim 1 further comprising an outlet chamber leading to said diaphragm valve and a connection between said outlet chamber and said collecting chamber.

10. The means set forth in claim 9 wherein a weir is provided on the floor of said collecting chamber, said weir serving to isolate any debris on said floor from said connection between said collecting chamber and said outlet chamber.

11. The means set forth in claim 1 further comprising a riser pipe leading from said collecting chamber to said diaphragm valve.

12. The means set forth in claim 11 wherein said riser pipe has a lower end forming an inlet end from said collecting chamber and a weir on the floor of said collecting chamber defines a well into which said lower end projects.

* * * * *